Dec. 1, 1959  F. ZWICKY  2,914,913
APPARATUS AND METHOD FOR JET PROPULSION
THROUGH WATER BY USE OF WATER
REACTIVE PROPELLANT
Filed Aug. 23, 1944  4 Sheets-Sheet 2
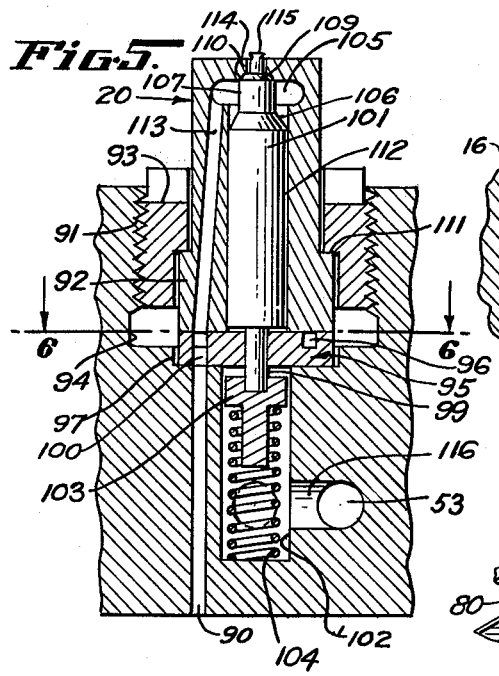
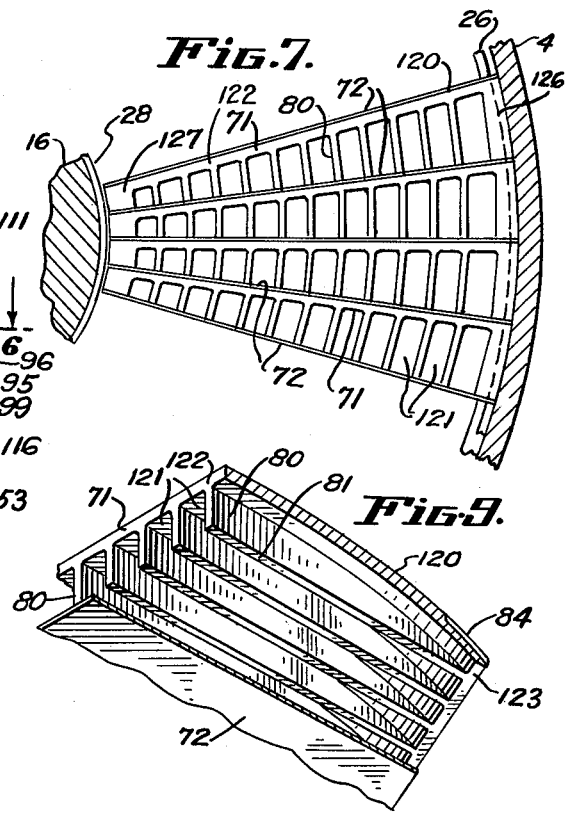
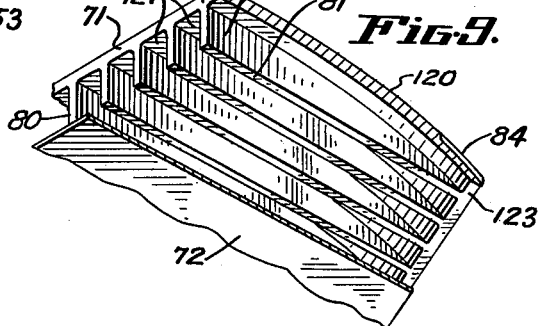
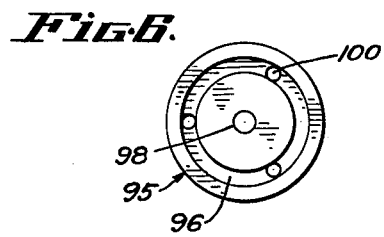
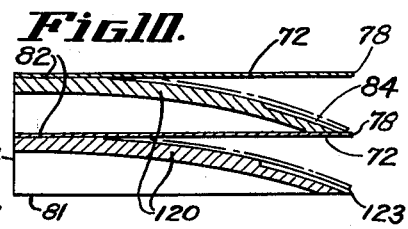
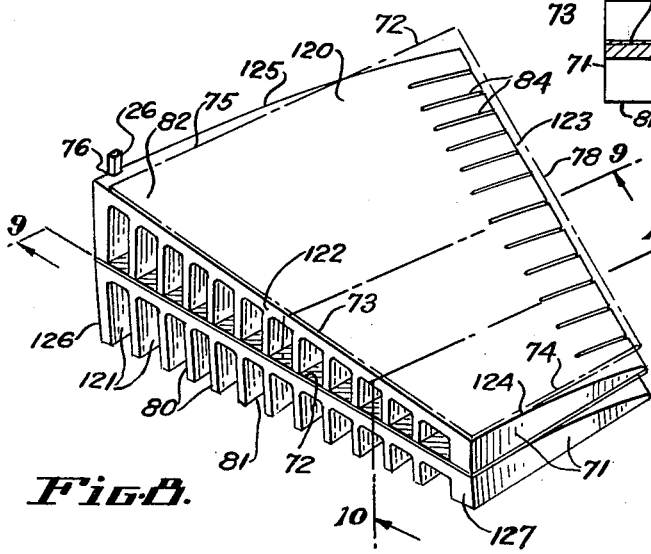
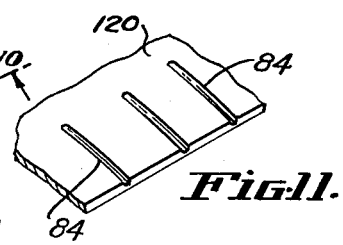
INVENTOR.
FRITZ ZWICKY
BY
Christie & Angus
ATTORNEYS INVENTOR.
FRITZ ZWICKY
BY
Christie & Angus
ATTORNEYS.

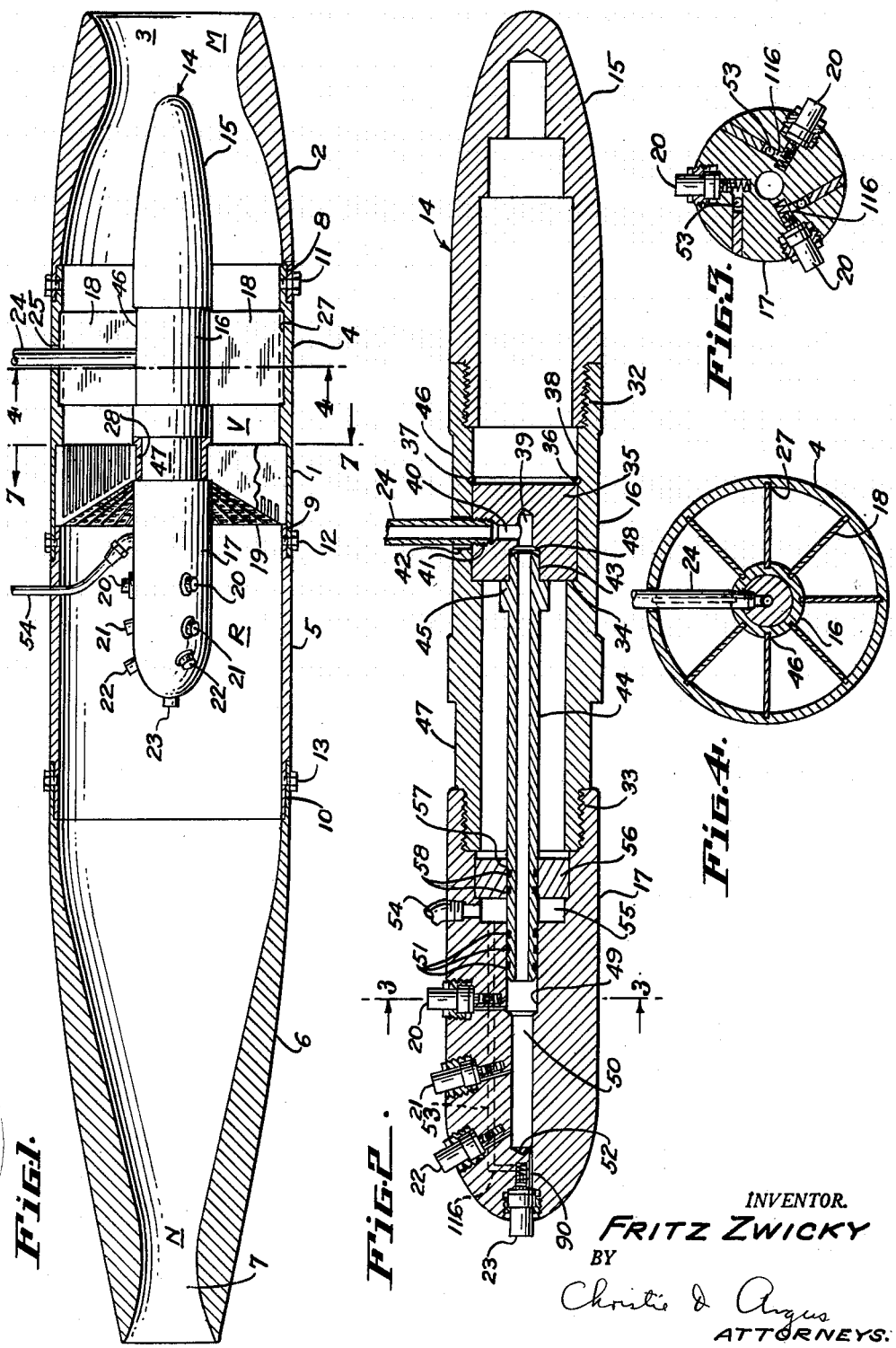

Dec. 1, 1959 F. ZWICKY 2,914,913
APPARATUS AND METHOD FOR JET PROPULSION
THROUGH WATER BY USE OF WATER
REACTIVE PROPELLANT
Filed Aug. 23, 1944 4 Sheets-Sheet 4
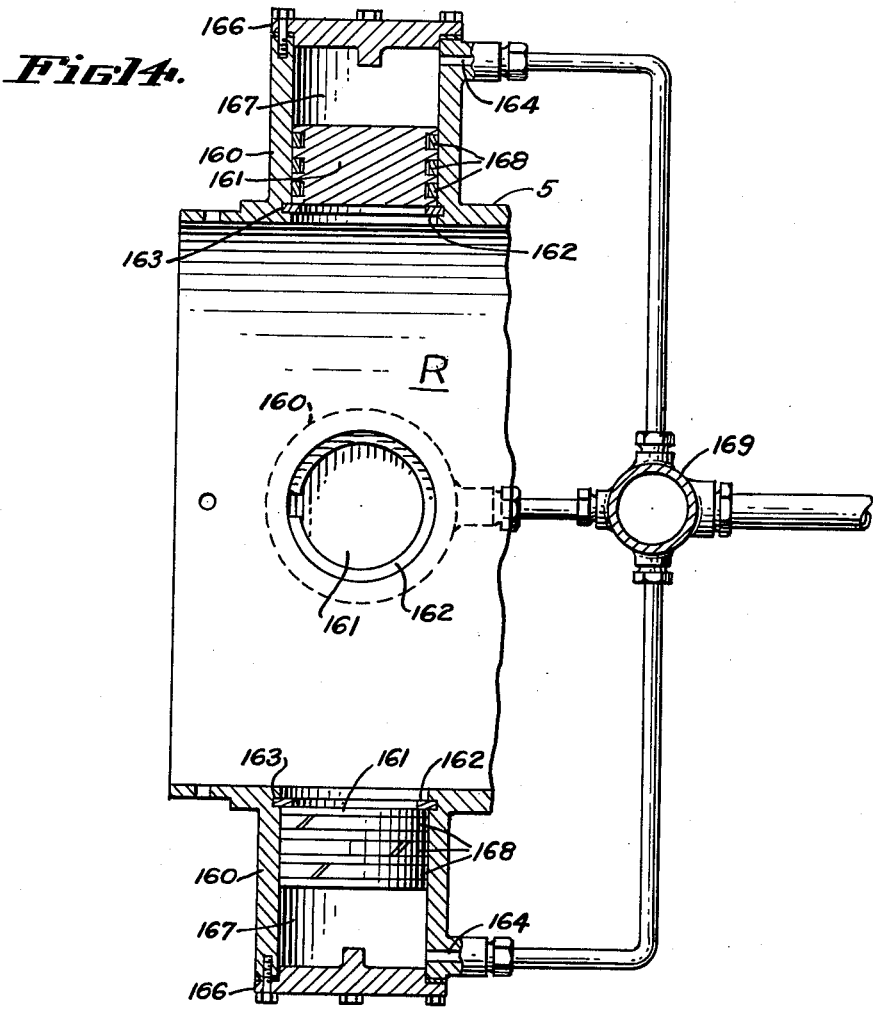
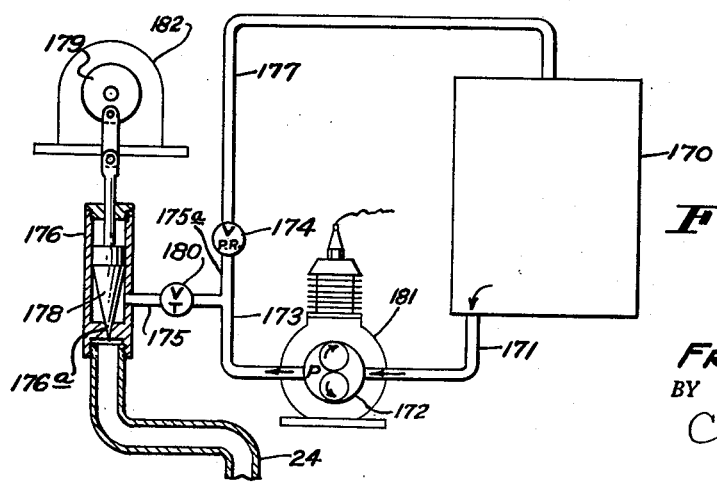
INVENTOR.
FRITZ ZWICKY
BY
Christie & Agnes
ATTORNEYS.

United States Patent Office 2,914,913
Patented Dec. 1, 1959

2,914,913
APPARATUS AND METHOD FOR JET PROPULSION THROUGH WATER BY USE OF WATER REACTIVE PROPELLANT

Fritz Zwicky, Pasadena, Calif., assignor, by mesne assignments, to Aerojet-General Corporation, Cincinnati, Ohio, a corporation of Ohio Application August 23, 1944, Serial No. 550,693

40 Claims. (Cl. 60—35.5)

This invention relates to propulsion units of the type adapted to be propelled through a fluid medium, and more particularly to means and methods for operating devices of this character driven by jet propulsion. The invention provides means for driving a reaction propelled device efficiently. More particularly, the invention provides jet propelled means capable of initiating its own motion through the fluid medium and of driving itself at both low and high speeds.

Jet propelled devices have been proposed heretofore for driving aircraft or the like through air, by admitting air from the atmosphere into a duct or chamber and feeding a combustible propellant such as gasoline into the chamber and igniting the mixture of gasoline and air by suitable means such as a spark plug. The explosion produces an exhaust jet of the gases of combustion producing the reaction thrust which propels the machine. Systems have also been proposed for propelling craft through water by attaching a water duct to the craft beneath the water and allowing water to flow in at one end of the duct and out the other. In these water propelled systems the propulsive force has been produced by the application of some means, for example, steam or air under pressure for driving the water out through the exhaust end.

My invention is an improvement over such arrangements heretofore proposed in that it provides a propulsion drive system which is capable of starting the craft or projectile through a fluid medium such as water by propulsive forces generated within itself, and is furthermore capable of extremely high speeds.

I carry out my invention by injecting into a channel through which fluid from the medium is passed, a chemical substance which reacts spontaneously with the fluid to produce energy and as large a volume of gases as possible. The arrangement is preferably such that the gaseous products of reaction produce a mass driving effect against the fluid in the channel forcing it out through the exhaust nozzle to create the propulsive force.

A feature of my invention is the provision in the channel between the inlet opening and the reaction region or chamber, of an automatically operable valve means which closes upon each reaction impulse and opens when the pressure drops, to admit more of the fluid medium.

In accordance with another feature of my invention, a reactive chemical or propellant is injected intermittently into a reaction chamber, which by its chemical reaction or combustion creates driving pulses in cooperation with the automatic valve. This feature is of special advantage in starting the propulsion unit in motion and propelling it at relatively low speeds.

According to a feature of construction the pressure on the medium in the reaction chamber is elevated by suitably proportioning the size of the entry port to the maximum diameter of V at the valve entry opening; thereby resulting in an increased energy output for each reaction pulse.

According to another feature of my invention the propulsion unit may be propelled at high speeds as a substantially open duct or channel with a substantially continuous exhaust jet from the exhaust nozzle. A related feature is the provision for converting the operation from the intermittent valve and pulse action at slow speeds to the valveless duct action at the higher speeds.

The propulsion device of my invention is operable in a water medium by the use of chemicals which react violently and spontaneously with water, such as alkali metal borohydrides, alkaline earth metal borohydrides, other metal borohydrides, metal hydrides, and metal silicides and borides and metals which combine violently with water giving off gas and heat. I prefer to use such substances as $LiBH_4, Al(BH_4)_3, LiH, B_2H_6$ or higher boron hydrides, as propellants to generate the required power for propulsion through water, although the operation is not limited to these substances. Other substances that may be used, for example, in place of the above are molten Mg, amalgamated Al, NaH, Na-K alloy, $$CaH_2, Be(BH_4)_2$$

$Mg(BH_4)_2, NaBH_4$, activated boron and activated silicon. Si and B are activated by alloying them with substances that make them water reactive. These are injected into the water producing gases and heat from the chemical reaction which in turn produce the exhaust jet which through its mechanical reaction generates the useful thrust.

A feature which may be used with considerable advantage in connection with such water reactive materials to develop the desired high thermodynamic efficiency is the use of relatively inert water insoluble substances in which the propellant is suspended or dissolved. These act to insulate the propellant and prevent it from reacting with the water immediately on injection until the substances have separated and the reacting substance has reached the proper position in the reaction chamber. Also the gases evolved in this manner will be released as a stream containing a large number of small gas bubbles capable of expanding greatly thereby insuring a high conversion of the internal energy into mechanical energy. If large gas bubbles are permitted to form a portion of the energy of reaction is lost due to the low compression ratio of the expanding gaseous masses.

The foregoing and other features will be better understood from the following detailed description and accompanying drawings of which:

Fig. 1 is a longitudinal cross-section view showing a device in accordance with this invention;

Fig. 2 is a longitudinal view in cross section showing a device including injectors embodied in the arrangement of Fig. 1;

Fig. 3 is an end view in cross section taken at line 3—3 of Fig. 2;

Fig. 4 is a front section view taken through plane 4—4 of Fig. 1;

Fig. 5 is an enlarged view in cross section showing one of the injector nozzles of Figs. 1 and 2;

Fig. 6 is a plan view of the injector plate taken on line 6—6 of Fig. 5;

Fig. 7 is a partial view, partially in cross section looking from the right end of Fig. 1, of the blade valve assembly taken at line 7—7;

Fig. 8 is a perspective view of a part of the valve assembly embodied in the arrangement of Fig. 1;

Fig. 9 is a broken detail view, partly in cross section, taken at line 9—9 of Fig. 8 showing the valve body construction;

Fig. 10 is a detail view in cross section taken at line 10—10 of Fig. 8;

Fig. 11 is a fragmentary view showing a detail of construction of the valve of Figs. 7 and 8;

Fig. 14 is a cutaway drawing partly in cross section of an alternative reaction chamber shell;

Fig. 15 is a schematic drawing of the fuel supply, pressure, and intermittent release system.

Figure 12:
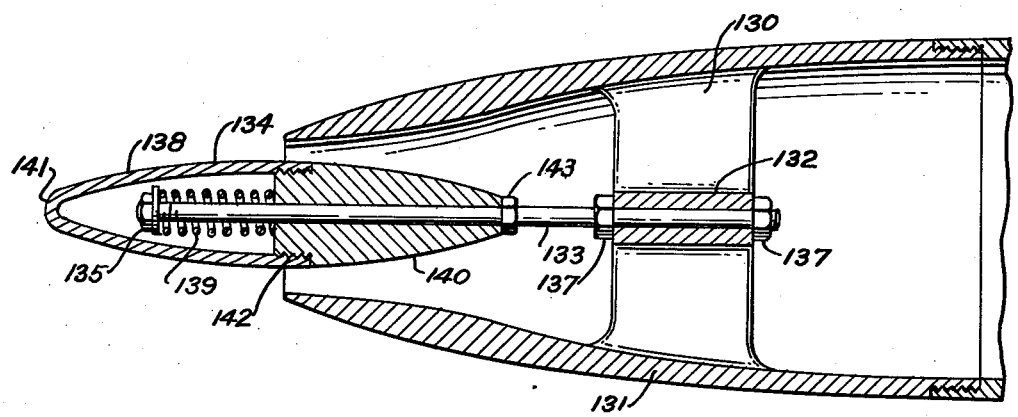
Fig. 12 is a longitudinal cross section view of an alternative type of tailpiece.

Referring first to Fig. 1, I have illustrated a propulsion unit constructed according to my invention, especially adapted for the propulsion of a projectile or craft through water. It comprises an outer shell 1 which may be torpedo-shaped. It has a nose piece 2, with a circular opening 3, a front center section 4, a center section 5, and a streamlined tailpiece 6 terminating in an exhaust nozzle portion 7 at the rear. The shell thus provides an elongated passageway adapted to take in water or whatever other fluid medium it is immersed in, through the inlet opening or mouth M, and expel it through the exhaust nozzle N. By the expression "elongated passageway" I mean a passageway having a longitudinal length substantially greater than the diameter of its cross-section. The entry part of the nose piece is preferably trumpet-shaped inside for a short distance from the opening to the throat and then again increases in diameter following a streamlined curve until it is the same as the maximum diameter of motor shell 4. It should be understood that this particular shape of the shell, while convenient and desirable for good operation need not necessarily be used in every respect, but might be departed from to such extent as particular conditions may dictate.

The outer surface of nose piece 2 may be streamlined from the leading edge at inlet opening 3 to the point where it meets front center section 4. Streamlining both inside and outside is desirable to prevent turbulence when the propulsion device is travelling rapidly through the fluid medium. For similar reasons the outside of tailpiece 6 is streamlined and the discharge side of nozzle 7 is flared out toward the rear from the throat of jet 7. When the propulsion device is installed in a craft, outside streamlining is not necessary since an outer encasing assembly (not shown) around the shell is the part which should have outside streamlining. The inside should, of course, preferably be streamlined in any event.

For purpose of assembly, I prefer to use slip joints 8, 9 and 10, which are secured rigidly together by a number of cap screws 11, 12 and 13. These sections may alternatively be threaded and screwed together, if desired, instead of being held by the cap screws.

There is centrally located within the shell 1, a central member or assembly 14, which is preferably elongated torpedo-shaped and streamlined. By the expression "elongated" I mean that its longitudinal length is greater than the diameter of its transverse cross-section. This central assembly 14 comprises a housing having a nose piece 15, a central portion 16, and a tailpiece 17 which are assembled together by threaded connections 32 and 33. The tailpiece contains injector nozzles, of which nozzles 20, 21, 22 and 23 are shown, for injecting reactant received from a supply pipe 24 into the reaction chamber R between the tailpiece 17 and the shell section 5. A valve assembly 19 for admitting the water or fluid medium into the reaction chamber R is located in the annular space between the central assembly 14 and the outer shell 5. This valve assembly forms the front boundary of reaction chamber R and separates it from the front vestibule V. The exhaust nozzle N is formed from the rear of the reaction chamber; and the water and reaction products developed in the reaction chamber pass through this nozzle at elevated velocity. This central assembly 14 is held in a central position by guide vanes 18 which fit into grooves 27 cut into the inside of shell section 4, and corresponding grooves 46 cut into the central portion 16 of the central assembly 14 which is more clearly shown in Fig. 4. This view is a cross section view taken at line 4—4 of Fig. 1. After the ends of the vanes are in their proper grooves they are secured by any suitable means, preferably spot welding.

Figure 7A:
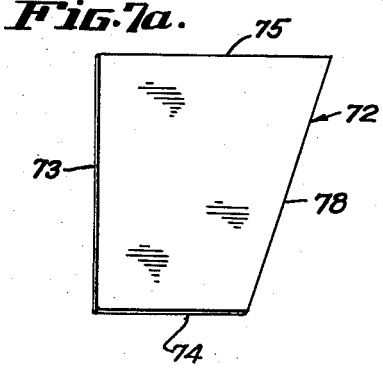
Fig. 7a is a view of a valve blade.
Figure 7B:
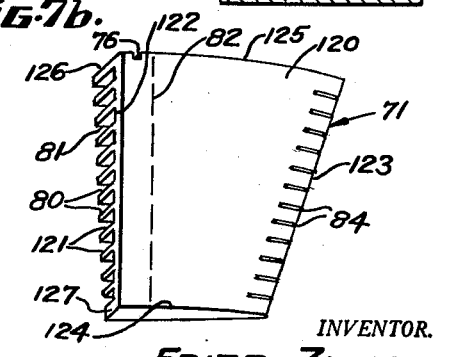
Fig. 7b is a perspective view of a valve body.

The construction of the blade valve assmbly 19 is described in detail with reference to Figs. 7, 7a, 7b, 8, 9, 10 and 11. This valve is built up of an assembly of alternating flexible blades 72 and rigid channel members 71 formed as illustrated in Figs. 7a and 7b respectively. Each of the rigid channel members 71 comprises a trapezoidal-shaped plate 120 the upper face of which is provided with a curvature as shown in Fig. 7b. The lower surfaces of the plates 120 are provided with a number of channels 121, formed by the channel members 80 which are integral with the plate and run parallel with each other as shown. These channel members 80 taper in depth, being deeper at the leading edge 122 and tapering at the rear edge 123 to coincide with the thickness of the rear edge of the plate. Furthermore, the successive channel members 80 increase uniformly in depth from one to the next from the inner edge 124 of members 71 toward the longer outer edge 125. Thus, the outer channel strip 126 is considerably deeper than the innermost channel strip 127, although all the channel strips 80 taper uniformly down to the rear edge 123 of members 71. The upper surface of members 71 is provided with a number of parallel grooves 84, corresponding with the number of channels and positioned to be centered with reference to the respective channels. Each of the channel members 71 is dimensioned so that its shorter edge 124 is adapted to be aligned longitudinally with the shell of the central assembly 14, and its outer edge 125 is adapted to be co-extensive longitudinally of inner surface of cylindrical shell 4. Each of the flexible plates 72 is of a trapezoidal-shape as shown in Fig. 7a in correspondence with the shape of channel members 71.

In assembling the valve assembly 19 the several flexible blades 72 are alternately interleaved between the several channel members 71 and are firmly held near their leading edges 73 between the channel strips 80 of one channel member and the front flat face 82 of the next.

This assembly arrangement is more clearly shown in Figs. 7, 8, 9 and 10. Fig. 7 shows the view of the valve assembly looking from the right hand end of Fig. 1; and shows that the alternate channel members 71 and flexible valve blades 72 are stacked all around the annular space between the central assembly 14 and the outer shell 4. The short edges 74 and 124 of the blades 72 and members 71 extend longitudinally along a collar 28 mounted on central assembly member 16 and the long edges 75 and 125 extend longitudinally along the shell 4. For convenience, only a segment of this annular valve assembly is shown in Fig. 7. To hold the individual valves in position on collar 28, matching grooves 76 may be cut into the outer end of valve element 71 and a split compression ring 26 is slipped into the annular space thus formed. After all valve blades and elements have been mounted on collar 28 the valve assembly 19 is slipped into position on reduced diameter 47 and locked in place when tailpiece 17 is screwed up tight. From the front, valve assembly 19 resembles a circular honeycomb as shown by Fig. 7.

Fig. 8 is a perspective view illustrating one of the flexible blades 72 sandwiched between two adjacent channel members 71. Fig. 9 is a view taken at line 9—9 of Fig. 8 looking up underneath the channel members 71 and showing part of a valve blade 72.

The curvature of the face 120 of each channel member is such that the rear edge 123, of each channel comes down and meets the rear edge 78 of the corresponding adjacent valve blade 72, as more clearly shown in Fig.

10. The arrangement is such that the lower edge 81, of all the channel partitions 80, of each channel member is flat against the flat surface of the blade member 72, as is illustrated in Fig. 10.

By this assembly arrangement the rear edges 78 of the flexible blades 72 are enabled to vibrate so as alternately to contact and move away from the rear edge 123 of the member 71. This creates the valve action as the valve is closed when the blades 72 are against the members 71. The grooves 84 serve to keep the valve blade from sticking in the open position.

Fig. 2 shows details of construction of the central assembly 14, the internal construction of which is designed to supply reactant to the propellant injectors. Nose piece 15 is preferably made hollow, as shown, to eliminate excess weight. Center portion 16 is hollow. The bore is enlarged from the front and is made to extend to about one-third or more of the distance back from the front end, where it is terminated by shoulder 34. A cylindrical section 35 slides into enlarged bore 38 and is locked in position against shoulder 34 by an expansion split ring 36 which slips into a machined groove 37. Cylindrical section 35 has an axial hole 39 bored to a sufficient depth from the rear to meet at right angles a hole 40 drilled from the side. Bore 40 is enlarged and threaded at 41 to receive the threaded end of feed pipe 24 which passes through a hole 42 in the wall of central portion 16. Feed tube 24 passes through hole 25 cut in the outer shell section 4 and connects to a reactant storage and pressure system shown in Fig. 15. Bore 39 is enlarged at 43 to a depth sufficient to permit insertion of feed conduit 44 up to shoulder 45 and allow a small clearance 48 between the tube 44 and the bottom of hole 43. Both hole 43 and the end of tube 44 are finished to close tolerances to enable the parts to be united by press fit. Tube 44 extends beyond the end of center portion 16 and well into tailpiece 17.

The propellant injectors, of which 20, 21, 22 and 23 are shown, are connected by conduits 90 which may be made by boring through the stock of the injector member as shown in Fig. 5 to main feed conduit 49 and 50 which runs axially through the middle of member 17 from the front end and continues rearwardly to a point 52 just beyond intake conduits 90 of injector nozzles 22. Bore 50 is enlarged at 49 to permit insertion of feed tube 44 and the joint is made leakproof by means of packing glands 51. Annular space 55 is separated from the bore in center portion 16 by means of an annular disk 56 which is thick enough to permit the use of two or more leakproof packing glands 58, and is welded at the outer circumference to form a solid seal. A central hole 57 permits passage of feed tube 44 and this connection is made leakproof by packing glands 58.

Fig. 5 shows the details of construction of one of the propellant injectors installed in its position in the injector member. A hole 91 is centered at the desired position in the injector member 17 and made larger in diameter than the base of injector body 92. This hole 91 is threaded part way in and the bottom threads are undercut as shown by 94 to permit slotted ring nut 93 free movement. Bore 91 is continued a short distance 97 on the same center but at reduced diameter to receive injector plate 95. Fig. 6 taken on line 6—6 shows the top view of injector plate 95 showing a number of orifices 100, which match corresponding conduits 90 and are connected together by an annular groove 96. Three orifices 100 are shown in this arrangement. Injector plate 95 has a central hole 98 which permits passage of a plunger stem 99 connected to the bottom of a piston plunger 101. Below injector plate 95 a hole 102 wide enough to accommodate injector springs 104 is drilled on the same center as bore 91 and 97 and continued for sufficient depth to accommodate injector spring 104 and a T-shaped spring guide 103 which connects plunger stem 101 and spring 104.

The injector comprises a cylindrical body 92 stepped down in diameter at shoulder 111 to conform to the outline of slotted ring nut 93. A central axial hole 112 is bored from the base and extends through the body of injector 20 to a point near the top of the injector body. At this point the bore 112 is enlarged to 105 in order to connect with a drilled conduit 113 which in turn meets annular groove 96 and so communicates with orifices 100 of injector plate 95.

Plunger 101 is cylindrical and is finished to a close tolerance to insure a leakproof fit when assembled in bore 112. The plunger stem 99, protruding from the bottom of the plunger 101, securely connects plunger 101 to the T-shaped spring guide 103. Plunger 101 has a short tapered section 106 which ends at reduced diameter 107 inside the enlarged area 105. Tapered section 110 in valve body 20 forms the valve seat which is closed when tapered section 109 of plunger 101 fits tightly against it. A small central hole 114 in the end of valve body 20 permits passage of reduced end 115 of plunger 101. This reduced end 115 is made smaller in diameter than hole 114 to permit passage of the reactant when the valve is open.

Injector 20 is assembled and placed on injector plate 95 which in turn is put in place after spring 104 and connector 103 have been installed in spring well 102. The entire assembly is held in position by slotted ring nut 93.

For the purpose of venting the spring wells and thus relieving any pressure which might accumulate in them, there is connected with each well a small passage 116 which may be provided by drilling. Passage 116 communicates with a passageway 53 which leads to the annular space 55 from where a venting tube 54 is brought out to the exterior medium, such as the water through which the craft travels. Fig. 3 is a cross sectional view taken at line 3—3 of Fig. 2, and shows the organization and arrangement of the injector valves in the tailpiece. Three injectors are shown located equi-distant around the tailpiece, each having its venting passage 116 leading into a passage 53. The other injectors 21 and 22 may similarly be arranged in groups of three (or more or less if desired) and have their venting passages 116 lead into the same corresponding passages 53. The valve 23 is located above at the tip of the tail.

Fig. 12 illustrates a tail section capable of providing a variable exhaust jet opening, and which may, if desired, be used instead of the tail section shown in Fig. 1. In the construction of Fig. 12 guide vanes 130 are secured to the outer shell of tailpiece 131 by suitable means, preferably welding. These vanes 130 are secured to a central support 132. A spring and closing member guide 133 is threaded, and slid into support 132 and locked in position by nuts 137. A nut 143 prevents the sliding section 134 from completely closing the jet orifice. Sliding section 134 comprises a hollow semi-elliptical section 138 having a rounded end 141 and threaded at the large end with threads 142 and a solid semi-elliptical section 140 drilled axially to permit sliding on guide member 133. This is threaded at the base with threads to screw into the threads 142 of section 138. Spring 139 is held in position by collar nut 135 and is housed inside hollow semi-elliptical section 138. When the pressure in the reaction chamber exceeds the pressure of spring 139, sliding section 134 is pushed rearwardly permitting a larger flow of fluid through the orifice. As the pressure decreases, section 134 will return to its original position, thereby proportionally decreasing the size of the orifice and insuring in this manner a constant jet velocity. By properly loading spring 139 it is possible to obtain the desired jet velocity for all ranges of pressure.

Figure 13:
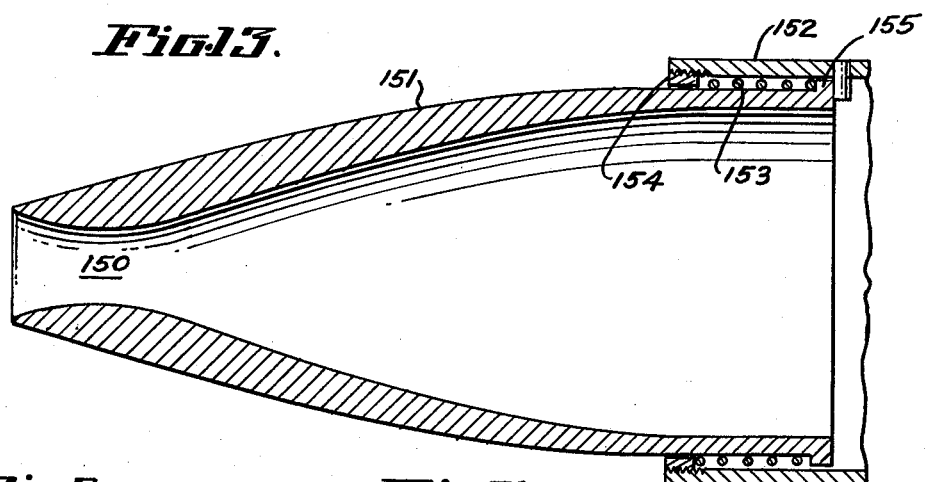
Fig. 13 is a longitudinal cross section view of a second alternative type of tailpiece.

Fig. 13 shows an expanding type of tailpiece which may be used as an optional alternative to either the tailpiece of Fig. 1 or that of Fig. 12. In this type of tailpiece orifice 150 at the throat of the jet remains fixed, and the peak pressure increases the distance between tailpiece orifice 150 and the reaction chamber (not shown). Tailpiece 151 telescopes into preceding section 152 and when the pressure is low rests in the position shown by Fig. 13. When the pressure exceeds the opposing force of spring 153, tailpiece 151 is forced to the rear compressing spring 153. As the pressure diminishes the tailpiece 151 will return to its normal position and thereby convert the potential energy in the spring to useful work. Spring 153 is held in place by means of guide ring 154 threaded to screw into the end of outer shell section 152 and guide shoulder 155 located at the forward end of tailpiece 151.

Another system for providing constant jet velocity is shown by Fig. 14. Cylinders 160 are uniformly spaced about the circumference of the reaction chamber similar to reaction chamber shell 5. A removable head 166 is bolted to cylinder 160 forming the pressure storage reservoir. Piston 161 slides in cylinder 160 and is prevented from leaving the cylinder by split ring 162 which slides into place in groove 163. Compressed air is introduced into chamber 167 by means of inlet 164 which connects to a compressed air chamber 169 and a suitable source (not shown). Piston rings 168 prevent the air from leaking past piston 161. The pressure formed by the reaction pushes piston 161 against the compressed air cushion in chamber 167 thereby compressing it still further. As soon as the pressure in the reaction chamber falls below that of the compressed air the pistons will return to their normal positions returning the energy required to further compress the air under pressure.

Fig. 15 indicates schematically an arrangement by which the propellant may be fed to the injectors. Propellant tank 170 is connected to gear pump 172 by conduit 171. Gear pump 172 may be driven by any convenient means such as a gasoline motor 181. Discharge from gear pump 172 flows into a branch conduit 173. One branch 175 leads to needle valve 176 and the other branch 175a connects the gear pump 172 to a constant pressure relief valve 174 of a suitable type such as is well known in the art. Any discharge from the constant pressure relief valve flows back into the propellant tank 170 through conduit 177. Needle 178 of needle valve 176 is attached eccentrically to a cam or wheel 179 which may be rotated by any convenient means preferably an electric motor 182 whose speed may be adjusted. Throttle valve 180 controls the pressure acting on the needle valve and line. The electric motor 182 causes the needle to move up and down periodically into, and out of the conical seat 176a of the valve 176 making the pressure to rise and fall in propellant feed tube 24 thereby intermittently feeding propellant into the reaction chamber as needle 178 opens and closes the discharge orifice. The speed of the motor may be regulated if desired by some suitable regulating system, and this will enable the speed of propulsion to be controlled.

In cases where control of the speed is unimportant the apparatus may be made to operate without any timing throttle to interrupt the flow of propellant. In such cases a continuous stream of propellant is injected into the reaction chamber. No propellant is lost since reaction will take place in the reaction chamber only as long as there is water present to react with the propellant. As soon as all the water is exhausted from the chamber in the course of an impulse, reaction will cease, gases will expand lowering the pressure, and as soon as the pressure within the chamber drops lower than the stagnation pressure at the valve entrances the valves will open to admit more water thereby permitting the reaction to proceed again to create another impulse. In this manner the apparatus will adjust its own operation.

The chemicals used as the propellant or reactant should be substances which are thermally stable, capable of withstanding shock and preferably not spontaneously inflammable. These compounds should be able to withstand grinding and should also be non-corrosive. A paste may be prepared by incorporating the finely ground reactant material in substances such as crystal oil, carbon tetrachloride, gasoline or saturated hydrocarbons. Any carrying medium used must be absolutely free of water. Grinding shall preferably be performed in one of the above mediums in order to prevent hydrolysis or oxidation of substance.

Grinding to a fine particle size, or in case the propellant chemical is a liquid, dispersing to fine droplet size, has been found advantageous for all of the water reactive chemicals in question. The speed of reaction with water rapidly decreases upon increasing the size of the droplets or particles which are injected into the reaction chamber. When large particles are used it has been found experimentally that they tend to form large gas bubbles having low internal pressure. This condition results in a poor conversion of the released chemical energy into useful kinetic energy due to the low expansion ratio of the large gas bubbles and the high loss of heat by conduction and radiation. For the above reasons it is advantageous to employ particles or droplets in which the diameter is made as small as possible.

The propellant is injected as a dispersion or emulsion and the rate of reaction may be varied somewhat by the choice of proper dispersing media.

The preferred propellant substance is one capable of reacting instantaneously with water, forming the lowest possible number of OH moles and producing the largest volume of water insoluble and non-condensable gas at the temperature and pressure existing in the system per unit weight of reactant. It is also desirable that the specific heat of the solid reactant be as low as possible. The minimum energy requirement for any reactant suitable for high application operation should be at least 5 kg.cal./gr. and should produce not less than 2000 liters/kg. of gas having a ratio of specific heats $\gamma = 1.41$. This type of reactant is necessary for operations where weight must be maintained at the minimum. For low application operation where weight is unimportant reactants of lower energy content and lower gas production may be used. The ideal propellant should possess a speed of reaction in the order of magnitude of $\frac{1}{100}$ of a second. An example of a reactant suitable for high application is $LiBH_4$. When this chemical reacts with water, according to the following equation:

the calculated energy released by $LiBH_4$ is approximately 9.44 kg. cal./gr., and this substance produces approximately 4112 liters of gas/kg.

An example of a reactant suitable for low application is NaH. When this substance reacts in water according to the following equation:

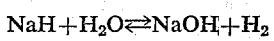

the energy released by NaH is approximately 1.236 kg. cal./gr. and produces approximately 1070 liters of gas/kg.

The rate of injection of the reactant into the reaction chamber is dependent on the scavenging time. Scavenging time is approximately defined as the ratio of the length of the duct to the forward velocity. The greater the scavenging time the slower will be the rate of injection, therefore, to obtain good efficiency chemical substances should react completely with the water during the interim between injections. For better operation it is sometimes desirable to delay the reaction of the chemical with the water after injection long enough to permit the reactant to reach the desired position within the reaction chamber. To accomplish this purpose substances such as saturated petroleum hydrocarbons, carbon tetrachloride, etc., may be added. The delay should preferably be of the order of $\frac{1}{100}$ of a second.

The ratio of weight of reactant to the weight of scavenging water is preferably of the order of magnitude between 1:1000 and 1:10,000.

The following is the manner in which the propulsion unit operates:

When the motor unit is at rest in the water, shell 1 fills with water, and since the water pressure inside reaction chamber R is equal to the water pressure of surrounding fluid medium the valve blades of assembly 19 will remain closed. To put the propulsion unit in operation the propellant feed system should be allowed to fill with the propellant which will be restrained from entering the reaction chamber R by the fact that the propellant injectors are closed. Gear pump 172 may then be started up, permitting the propellant pressure to build up in the system. When the pressure is sufficiently high, for example, high enough to cause relief valve 174 to open and discharge excess propellant into tank 170, cam 179 is set into rotation by whatever driving system is used. This opens and closes the needle valve 178 at regular intervals, for example two or three times a second. At each opening of the needle valve propellant is sent through it under pressure from pump 172 and this pressure is transmitted through the propellant conduits 24, 44, and 50, and through the individual passageways 90, holes 100, annuli 96 and passageways 113 to the chamber 105 of each propellant injector. This pressure is sufficient to depress plunger valve 101 against the force of spring 104, thereby opening the injector valve at 110 and causing propellant to squirt into the reaction chamber R. Propellant is thus injected into chamber R in intermittent squirts, the frequency of which is established by the rate of opening and closing of the needle valve 178. The mass may be regulated by pressure throttle valve 180.

The injected propellant reacts instantaneously when coming in contact with the water in reaction chamber R and generates heat and large volumes of gas and steam under pressure. The expansion of the gas and steam from the high pressures and temperatures generated by the reaction causes the blade valve assembly 19 to close tightly, by pressing the flexible blades 72 against the rear edges 123 of members 71 as shown in Fig. 10. This causes the water, steam, inert gas and residues to be forced out of the duct through the rear nozzle 7 and at the same time prevents the entrance of any more water into the reaction chamber from the mouth opening 3 until the pressure within the chamber becomes lower than the water pressure at the valve entry. When the pressure within the reaction chamber R becomes lower than the pressure at the mouth side of the valve assembly 19 the valve will open, by the pushing away of blades 72 from the rear edges of plates 123 and permit water to flow into reaction chamber R to replace the water that was exhausted by the gas and steam under pressure and the heat generated by the reaction.

The speed of the unit through the water may be controlled by the operator by adjusting the frequency of the propellant injections and the mass injected per second in any suitable manner, for example, by regulating the speed of the motor driven cam 179 and the pressure acting on propellant in the injection tube 44. The loading of injector springs 104 may be varied for each set of injectors so that each following set will require greater pressure to open it than was required to open the preceding set. In this manner only one set of injectors will operate at low pressure and as the operator increases the pressure in the propellant line more of the injector groups would come into operation. This control may be obtained, for example, by placing a throttle valve which will regulate the pressure on the propellant feed tube.

As the speed increases, the rate of opening and closing of the water valve 19 correspondingly increases so that the flexible members 72 will vibrate with increasing rapidity intermittently to admit the water into the reaction chamber. If the speed becomes great enough the valve operation will reach a point where the valve members will cease to vibrate and will remain substantially open due to the extremely high pressure of the water at valve entry V which increases greatly with increasing speed.

The propulsion unit may then be operated as a valveless duct with a practically steady flow of water through it from its mouth to its exhaust nozzle. The rate of propellant injections will then be so high as to become almost continuous so that substantially continuous reaction is occuring in the reaction chamber. Owing to the high pressure at the stagnation cross section V the force of the reaction will continue to be exerted in the rearward direction through the exhaust nozzle. It may be desirable, when such high speed is reached to discontinue the operation of the needle valve and simply leave this valve open for a continuous flow of propellant.

The location of the injectors pointing from the several positions around the central tailpiece 17 into the surrounding annular reaction chamber R has the effect of causing the gases from the reaction substantially to fill this annulus with a mixture of water and numerous small gas bubbles, the explosive expansion of which transmits instantaneously kinetic energy to the surrounding water which on expulsion through the exhaust nozzle N, through its mechanical reaction generates the desired thrust. Efficiency of operation is correlated with the thermal efficiency of expansion which increases as the expansion ratio increases and the propulsive efficiency which increases as the mass of the entrained fluid increases relative to the mass of the propellent injected; and this in turn is dependent on the spacial distribution of the gases of reaction in the annular region R. I have enhanced this special distribution of the gases by positioning the propellant injectors in such a manner that the charges of the chemical are distributed substantially uniformly throughout this region R. I have done this by the provision of changing angles of the sets of injectors 20, 21, 22 and 23. Thus, injectors 20, being perpendicular to the axis of the tailpiece 17, squirt their chemical charges rapidly toward the inner wall of shell 5; the next set of injectors 21 being inclined somewhat rearwardly at a slight angle send their chemical charges in a more rearward direction so that the chemical does not go directly out to the shell 5; and the sets of injectors 22, being even more rearwardly inclined send their charges at positions still further remote from the outer shell.

The character of the chemical is preferably such that there is some slight delay from the initial injection into the water and its maximum reaction effect. The pressure on the reactant should accordingly be adjusted so that the intermittent squirts will send most of the chemical charges from injector 20 out near the shell before reaction starts; and the charges from injectors 21 and 22 will react principally at regions progressively closer to tailpiece 17. Injector 23 being at the tip of the tailpiece will produce reaction at the center. In order to assist in producing a desired delay in the reaction so as to allow the several chemical charges to reach their optimum positions as described above, it may be desirable to suspend the chemical in the tank in a water insoluble non-reactive liquid which, after injection into the water, separates from the chemical charges due to its lower surface tension after the charges have travelled some distance into the water, thereby preventing the reaction until the charges reach the desired positions and causing the propellant to react with the water forming small gas bubbles.

By this combination of injector positions and somewhat delayed reaction, provision is made that the gas bubbles from the reaction will suddenly be generated substantially throughout the reaction annulus R and also at the center, on each impulse, thereby transmitting most effectively the chemical energy available to the water in the duct, the resulting motion of which subsequently produces the propulsive power desired.

For maximum propulsive efficiency it is desirable to equalize the thrust or the exhaust velocity at the exhaust nozzle throughout the cycle of operation and thus smooth out to some extent the sharpness of the thrust impulse. This may be done if desired by use of the tailpiece arrangements of either Figs. 12 or 13 in place of the tailpiece used in Fig. 1, also by proper initial distribution of gas bubbles which may be determined experimentally.

In the arrangement of Fig. 12 the pressure of the reaction in the reaction chamber moves the tail orifice closure member 135 rearwardly against the force of spring 139 to enlarge the jet opening somewhat. As the reaction pressure diminishes toward the end of each reaction pulse the closure member 135 moves toward the exhaust nozzle thereby assisting in maintaining constant velocity flow of water through it, until the orifice 138 again attains minimum opening. In this manner the outlet velocity of the water is maintained constant throughout the cycle to provide higher propulsive efficiency.

In the arrangement of Fig. 13, the reaction pressure has the effect of elongating the longitudinal dimension of the unit by moving tailpiece 151 rearwardly against the force of spring 153. The energy stored in the spring thus becomes applied after the force of each reaction pulse is dying down to continue the ejection of water through the exhaust nozzle due to shortening of the length of the unit again.

The propulsion unit of my invention is capable of making efficient use of the energy generated by the reaction without subjecting the walls and apparatus to excessive temperatures and pressures. This is due to the fact that the heat of reaction on instantaneous expansion of the generated gas bubbles is immediately transformed into kinetic energy of a large mass of water thereby preventing it from reaching the walls and other metal portions of the apparatus, at the same time this kinetic energy plus the residual pressure formed by the reaction is relieved by the continuous exit of the fluid through the exhaust jet. In addition more efficient utilization of energy is achieved by conducting the reaction in a region of higher pressure (stagnation pressure) than that of the surrounding fluid medium. The energy required to compress the fluid is low compared to the large amount of work obtained from the gases when expanding from a pressure equivalent to the sum of the pressure resulting from the reaction and the pressure to which the fluid had been raised above that of the fluid in the free stream. This energy used to compress the fluid is recovered on expansion except for the amount lost due to duct losses. The pressure of the incoming fluid is elevated from that of the surrounding free stream fluid by means of the design of my apparatus. The greater the diameter of the valve port circle is increased over the diameter of the entry throat, the closer the fluid will approach its stagnation pressure.

Stagnation pressure is defined as:

$$P_s = P_o + \eta_d \frac{\rho}{2} u_0^2$$

wherein $N_d$ = diffuser efficiency
$P$ = the pressure
$p$ = density of the fluid medium
$u$ = velocity Subscript $o$ is the free stream value Practically, it is impossible to attain theoretical maximum stagnation pressure because losses such as turbulence, friction, etc., greatly increase with the increase in size of the maximum diameter of V over the diameter of the entry. As a result the ultimate efficient design will be one that is capable of obtaining the highest approach to stagnation pressure and still keep the resultant losses low.

In my invention the preferable ratios of entry diameter to the maximum diameter at the valve entrance V are 1:2 and 1:3.

It will be recognized in accordance with my invention I have provided a propulsion unit adapted to be started up under its own power from a position of rest and to operates at low speed, if desired, by a system of impulses determined by the rate and amount of propellant injected in cooperation with the automatically operating valves. The propulsion unit may furthermore be converted in its operation from that of a impulse with valve operation, to that of a valveless duct with a steady thrust.

It will be understood that the drawings and foregoing detailed description thereof have described and explained a particular embodiment of my invention useful for operation in water and have indicated propellants and their performances suitable for use with water. It should be understood, however, that the invention is not limited to the particular embodiment shown, but only in accordance with the appended claims. Other embodiments may suggest themselves in respect to particular circumstances. For example, the arrangement might be used in other fluid media than water, for example, in air; and in such a case a propellant suitable for reacting in air such as $Al(BH_4)_3$ could be used instead of those which are only suited for use in water. Moreover the propellant injection arrangement might have to be modified somewhat from that illustrated, to adapt it more particularly for some propellants which might be used in air.

I claim:

1. A reaction propelled device adapted for propulsion through water, said device comprising an elongated passageway having an inlet opening for admitting water at one end and an exhaust opening at the other, an elongated member encasing a propellant conduit fixed in position within said passageway and having its longitudinal axis substantially parallel with the longitudinal axis of said passageway, said elongated member having near its rear end a plurality of stationary propellant injectors, means for supplying propellant to said injectors, an automatically operable blade valve located between said inlet opening and said propellant injectors and filling the space at a position between said elongated member and the shell of the passageway, said valve being adapted automatically to open when the pressure on it from the mouth end of said passageway is greater than the pressure in the reaction chamber and to close when the pressure at the mouth end is less than in the reaction chamber, the diameter of the channel at the valve being greater than the diameter of the inlet opening.

2. Apparatus according to claim 1 in which there is provided an annular space between the injectors and the shell of the passageway and said propellant automatically reacting with the water upon its injection, thereby closing the valve and causing water to be impelled toward the exhaust nozzle.

3. A jet propulsion unit comprising an internally streamlined elongated channel having an entry opening and a jet exhaust, propellant injector housing located within the channel, a blade valve assembly positioned on the housing, a reaction chamber located in the channel behind and adjoining said valve assembly, said housing having a propellant conduit and a plurality of injectors communicating with the conduit and discharging into said reaction chamber, a propellant source, means for applying pressure on the propellant from the source, and means for intermittently releasing the pressurized propellant to said injectors.

4. Apparatus according to claim 3 provided with means for relieving back pressure on said injectors and exhausting said back pressure, and with means for regulating the speed of injections.

5. A jet propulsion unit adapted to be propelled through water, comprising a streamlined channel having a water inlet opening and an exhaust nozzle, a water valve adapted to open and close automatically and located in said channel, the diameter of the channel at the valve being greater than the diameter at the water inlet opening, propellant injecting means fastened in a fixed position within said channel and located at the rear of said valve, said injecting means comprising an elongated propellant conduit housing extending in the direction of the axis of said channel and having a plurality of propellant injectors situated along its length, means for forcing through said injectors and into the water of said chamber in intermittent spurts a propellant which is spontaneously reactive with water, whereby at each injection of propellant, a reaction of the propellant with the water takes place, causing said water valve to close and forcing the water and products of reaction out through said exhaust nozzle.

6. Apparatus according to claim 5 in which different injectors of said injection means having different angularities of their axes, the foremost injectors having their axes substantially perpendicular to the axis of the channel and the rearward injectors having their axes inclined more nearly parallel to the axis of the channel whereby the reaction with water takes place substantially throughout the cross section of the channel, producing acceleration of the fluid toward the exhaust nozzle.

7. Apparatus according to claim 5 in which there is incorporated in the propellant a substance which is inert to water, said substance being from the group consisting of saturated petroleum hydrocarbons and carbon tetrachloride so that upon injection of the propellant into the water the inert substance coats the injected propellant particles to delay the reaction with the water to allow the propellant particles to be injected a substantial distance into the water before the reaction occurs.

8. Apparatus according to claim 5 in which the propellant comprises an alkali metal borohydride suspended in crystal oil.

9. Apparatus according to claim 5 in which the propellant comprises a metal borohydride from the group consisting of lithium, aluminum, beryllium, magnesium and sodium borohydrides.

10. Apparatus according to claim 5 in which the propellant comprises an alkali hydride suspended in crystal oil.

11. Apparatus according to claim 5 in which the propellant comprises a metal hydride, from the group consisting of lithium, calcium and sodium hydrides, suspended in crystal oil.

12. Apparatus according to claim 5 in which the propellant comprises a metal borohydride, from the group consisting of lithium, aluminum, beryllium, magnesium and sodium borohydrides, suspended in water insoluble non-reactive substances from the group consisting of saturated petroleum hydrocarbons and carbon tetrachloride.

13. Apparatus according to claim 5 in which the propellant comprises aluminum borohydride.

14. Apparatus according to claim 5 in which the propellant comprises sodium potassium alloy.

15. The method of propelling in water a projectile of the type having a passageway for the water, an inlet opening at one end of the passageway and an exhaust nozzle at the opposite end of the passageway, which comprises intermittenly injecting into the passageway a propellant which is spontaneously reactive in water, thereby forming gas and intermittently increasing the pressure in the passageway, closing the passageway intermittently in response to the intermittent increase in pressure, and thereby intermittently interrupting the flow of water through said passageway, and at each interruption forcing a mass of water and reaction products toward the exhaust nozzle to produce a reaction jet through the nozzle.

16. The method of propelling through water a reaction propelled device having a reaction chamber and an exhaust nozzle which comprises admitting water into the reaction chamber and intermittently injecting into the water in the reaction chamber a propelling substance having a speed of reaction in water in the order of magnitude of $1/100$ of a second, reacting some of the water with the propelling substance in the chamber to generate steam and water insoluble gas and ejecting the water remaining in the chamber through the exhaust nozzle with the gas thus formed.

17. The method of propelling through water a reaction propelled device having a reaction chamber and an exhaust nozzle which comprises admitting water into the reaction chamber and intermittently injecting into the reaction chamber an alkali metal borohydride, reacting some of the water with the alkali metal borohydride in the chamber to generate heat, steam and water insoluble gas and ejecting the water remaining in the chamber through the exhaust nozzle with the gas thus formed.

18. The method of propelling through water a reaction propelled device having a reaction chamber and an exhaust nozzle which comprises admitting water into the reaction chamber and injecting into the reaction chamber a metal borohydride from the group consisting of lithium, aluminum, beryllium, magnesium and sodium borohydrides, reacting some of the water with the metal borohydride in the chamber to generate heat, steam and water insoluble gas and ejecting the water remaining in the chamber through the exhaust nozzle with the gas thus formed.

19. The method of propelling through water a reaction propelled device having a reaction chamber and an exhause nozzle which comprises admitting water into the reaction chamber and injecting into the reaction chamber a boron hydride, reacting some of the water with the hydride in the chamber to generate heat, steam and water insoluble gas, and ejecting the water remaining in the chamber through the exhaust nozzle with the gas thus formed.

20. The method of propelling through water a reaction propelled device having a reaction chamber and an exhaust nozzle which comprises admitting water into the reaction chamber and injecting into the reaction chamber aluminum borohydride, reacting some of the water with the aluminum borohydride in the chamber to generate heat, steam and water insoluble gas and ejecting the water remaining in the chamber through the exhaust nozzle with the gas thus formed.

21. The method of propelling through water a reaction propelled device having a reaction chamber and an exhaust nozzle which comprises admitting water into the reaction chamber and injecting into the reaction chamber $B_2H_6$, reacting some of the water with the $B_2H_6$ in the chamber to generate head, steam and water insoluble gas and ejecting the water remaining in the chamber through the exhaust nozzle with the gas thus formed.

22. The method of propelling through water a reaction propelled device having a reaction chamber and an exhaust nozzle which comprises admitting water into the reaction chamber and injecting into the reaction chamber alkali metal hydrides, reacting some of the water with the alkali metal hydrides in the chamber to generate heat, steam and water insoluble gas and ejecting the water remaining in the chamber through the exhaust nozzle with the gas thus formed.

23. The method of propelling through water a reaction propelled device having a reaction chamber and an exhaust nozzle which comprises admitting water into the reaction chamber and injecting into the reaction chamber sodium potassium alloy, reacting some of the water with the sodium potassium alloy in the chamber to generate heat, steam and water insoluble gas and ejecting the water remaining in the chamber through the exhaust nozzle with the gas thus formed.

24. The method of propelling through a water medium a reaction propelled device having a reaction chamber and an exhaust nozzle which comprises admitting water from the medium into the reaction chamber and injecting into the water in said reaction chamber an alloy of sodium and potassium which reacts spontaneously with water generating heat, steam and water insoluble gases, thereby ejecting said water through the exhaust nozzle.

25. In the propulsion through a water medium, of a reaction propelled device of the type having a duct provided with an inlet opening through which water from the medium is admitted, and an exhaust nozzle through which the water is ejected, a valve located in the duct behind the inlet opening, a reaction chamber between the valve and the exhaust nozzle, the method which comprises injecting intermittently into the chamber immediately back of the valve, a propellant which spontaneously reacts with the water of the medium with a speed of reaction in the order of magnitude of $1/100$ of a second, thereby generating gas and creating pressure which closes the valve and creates an exhaust jet including water through the exhaust nozzle.

26. In the operation through a water medium of a reaction propelled device of the type having a passageway with an inlet opening for entry of the water from the medium and an exhaust nozzle, through which the water is ejected, and an automatically operable valve located between the inlet opening and the exhaust nozzle, said valve being adapted to open to pass water from the medium when the pressure of the medium on the inlet side of the valve is greater than the pressure in the passageway on the opposite side of the valve, and to close when the pressure on said opposite side of the valve is greater than at the inlet side of the valve, the method which comprises injecting intermittently into the passageway behind the valve a propellant capable of spontaneously reacting with the water with a speed of reaction in the order of magnitude of $1/100$ of a second, whereby reaction takes place intermittently in the passageway, causing intermittent closing of the valve upon each reaction and a corresponding ejection of a jet including water through the nozzle.

27. A reaction propelled device adapted for propulsion through a fluid medium, comprising a passageway having an inlet opening for permitting entry of the fluid from the medium, and an exhaust nozzle through which the fluid is ejected, an automatically operable valve located between the inlet opening and the exhaust nozzle, said valve being operable to open to admit the fluid passing into the inlet opening from the medium when the pressure on the inlet side of the valve is greater than the pressure on the opposite side of the valve, and to close when the pressure on said opposite side is greater than the pressure on the inlet side, a reaction chamber between the valve and the nozzle, means for injecting intermittently into said reaction chamber a propellant, means for causing decomposition of the propellant intermittently in the chamber, thereby causing intermittent pressure and ejection of products of reaction and fluid through the exhaust nozzle, and a cylinder containing a movable piston in communication with the passageway between the valve and the nozzle, one side of said piston being acted upon by the pressure in the chamber, and the other side of said piston being in communication with an enclosed chamber containing a compressible fluid whereby the intermittent pulsations of pressure within the chamber urge said piston against said compressible fluid, and the compressible fluid urges the piston toward the chamber between said pulsations, whereby the intermittent pressure changes in the chamber are minimized.

28. A reaction propelled device adapted for propulsion through a fluid medium, comprising a passageway having an inlet opening for permitting entry of the fluid from the medium, and an exhaust nozzle through which the fluid is ejected, an automatically operable valve located between the inlet opening and the exhaust nozzle, said valve being operable to open to admit the fluid passing into the inlet opening from the medium when the pressure on the inlet side of the valve is greater than the pressure on the opposite side of the valve, and to close when the pressure on said opposite side is greater than the pressure on the inlet side, a reaction chamber between the valve and the nozzle, means for injecting intermittently into said reaction chamber a propellant, means for causing decomposition of the propellant intermittently in the chamber, thereby causing intermittent pressure and ejection of products of reaction and fluid through the exhaust nozzle, and a plurality of cylinders each containing a movable piston, each cylinder being in communication with the passageway between the valve and the nozzle and having its longitudinal axis directed toward the longitudinal axis of the passageway, and each cylinder containing a piston, there being an enclosed chamber at the side of each piston remote from the passageway, said chamber containing a compressible fluid, whereby the intermittent pulsations of pressure within the passageway urge each piston against the compressible fluid, and the compressible fluid urges the piston toward the passageway between said pulsations.

29. Apparatus according to claim 28 in which the fluid in the chambers is compressed air.

30. A jet propulsion unit comprising an internally streamlined channel having an entry opening and an exhaust nozzle, a central support positioned concentrically in the channel, a valve secured on said central support and located across the channel, propellant injector means mounted on the central support for discharging propellant into the duct behind the valve, and means for intermittently forcing propellant through the injectors, the diameter of the channel at the valve being between two and three times the diameter of the entry opening.

31. The method of operating through a water medium a jet propulsion device comprising a duct having an inlet opening and an exhaust nozzle, and an automatically operable valve across the duct, which comprises intermittently injecting aluminum borohydride into the duct downstream from the valve in the presence of water from the medium.

32. The method of operating through a water medium a jet propulsion device comprising a duct having an inlet opening and an exhaust nozzle and an automatically operable valve across the duct, which comprises intermittently injecting $B_2H_6$ into the duct downstream from the valve in the presence of water from the medium.

33. A jet propulsion unit comprising a channel having a water inlet opening for admitting water into the channel and an exhaust opening through which water leaves the channel, a valve located across the channel, a propellant injector means having an injector orifice in a fixed position relative to the channel within the channel downstream from the valve, and means for intermittently forcing water-reactive propellant through the orifice into the water in the channel, said valve being adapted automatically to open when the pressure on the upstream side of it is greater than the pressure on the downstream side of it, and to close when the pressure at the upstream side of it is less than the pressure on the downstream side of it.

34. A jet propulsion unit comprising a channel having a water inlet opening for admitting water into the channel and an exhaust opening through which water leaves the channel, a valve located across the channel, a propellant injector means having an injector orifice located within the channel downstream from the valve, and means for intermittently forcing water-reactive propellant through the orifice into the water in the channel, said valve being adapted automatically to open when the pressure on the upstream side of it is greater than the pressure on the downstream side of it, and to close when the pressure at the upstream side of it is less than the pressure on the downstream side of it, the position of said injector orifices relative to the channel being independent of movement of the valve.

35. Apparatus according to claim 5 in which the propellant comprises $B_2H_6$.

36. Apparatus according to claim 5 in which the propellant comprises a boron hydride.

37. Apparatus according to claim 5 in which the propellant comprises molten magnesium.

38. Apparatus according to claim 5 in which the propellant comprises boron alloyed with material making it water reactive.

39. The method of propelling through water a reaction propelled device having a reaction chamber and an exhaust nozzle which comprises admitting water into the reaction chamber and injecting into the reaction chamber molten magnesium, reacting some of the water with the magnesium in the chamber to generate heat, steam and water-insoluble gas, and ejecting the water remaining in the chamber through the exhaust nozzle with the gas thus formed.

40. The method of propelling through water a reaction propelled device having a reaction chamber and an exhaust nozzle which comprises admitting water into the reaction chamber and injecting into the reaction chamber boron, reacting some of the water with the boron in the chamber to generate heat, steam and water-insoluble gas, and ejecting the water remaining in the chamber through the exhaust nozzle with the gas thus formed.

References Cited in the file of this patent

UNITED STATES PATENTS

| | | |
|---|---|---|
| 515,500 | Nobel | Feb. 27, 1894 |
| 730,042 | Okun | June 2, 1903 |
| 789,334 | Orr | May 9, 1905 |
| 909,536 | Brindley | Jan. 12, 1909 |
| 1,054,615 | Rauch | Feb. 25, 1913 |
| 1,130,090 | Kutschinski | Mar. 2, 1915 |
| 1,369,672 | Koenig | Feb. 22, 1921 |
| 1,856,552 | Hadamik et al. | May 3, 1932 |
| 1,980,266 | Goddard | Nov. 13, 1934 |
| 1,983,405 | Schmidt | Dec. 4, 1934 |
| 2,142,601 | Bleecker | Jan. 3, 1939 |
| 2,351,750 | Fawkes | June 20, 1944 |

FOREIGN PATENTS

| | | |
|---|---|---|
| 798,489 | France | Mar. 10, 1936 |
| 863,928 | France | Jan. 6, 1941 |
| 357,797 | Germany | Sept. 1, 1922 |
| 640,228 | Germany | Dec. 28, 1936 |
| 522,935 | Great Britain | July 1, 1940 |
| 523,468 | Great Britain | July 15, 1940 |